United States Patent [19]

Brehm

[11] 3,898,168

[45] Aug. 5, 1975

[54] PREVENTION OF MAGNESIUM CARBONATE PRECIPITATION BY WATER FROM CRANKCASE OIL CONTAINING HIGH BASE MAGNESIUM SULFONATE

[75] Inventor: Allen Erwin Brehm, Griffith, Ind.

[73] Assignee: Standard Oil Company, Chicago, Ill.

[22] Filed: July 21, 1972

[21] Appl. No.: 273,686

[52] U.S. Cl. .......................... 252/32.7 E; 252/33.4
[51] Int. Cl. ............................................ C10m 1/48
[58] Field of Search ............. 252/32.7 E, 33.4, 52 A

[56] References Cited
UNITED STATES PATENTS

| | | | |
|---|---|---|---|
| 2,850,455 | 9/1958 | Kern et al. ...................... 252/33.4 X |
| 2,964,473 | 12/1960 | Hughes et al. ................. 252/33.4 X |
| 3,219,666 | 11/1965 | Norman et al. ............ 252/51.5 A X |
| 3,368,972 | 2/1968 | Otto .................................. 252/47.5 |
| 3,377,281 | 4/1968 | Gower ........................... 252/32.7 E |

*Primary Examiner*—Patrick P. Garvin
*Assistant Examiner*—Andrew H. Metz
*Attorney, Agent, or Firm*—Fred R. Ahlers; Arthur G. Gilkes; William T. McClain

[57] ABSTRACT

Crankcase lubricant oil containing high based magnesium sulfonate and zinc dialkyl dithiophosphate antioxidant-antiwear addition agents when contaminated with 1–2 weight percent water tends to precipitate magnesium carbonate particles of a size in the range of 20–60 microns which plug filters having elements of 10–15 micron porosity. By substitution of higher base number magnesium sulfonate and use of small amount of polyether antirust additive with increased zinc dialkyldithio phosphate additive formation of filter plugging magnesium carbonate is prevented.

5 Claims, No Drawings

PREVENTION OF MAGNESIUM CARBONATE PRECIPITATION BY WATER FROM CRANKCASE OIL CONTAINING HIGH BASE MAGNESIUM SULFONATE

BACKGROUND OF INVENTION

Crankcase lubricating oils for present-day automobile engines are customarily formulated by dissolving in base stock lubricant oils balanced amounts of a dispersant, zinc dialkyl dithiophosphate antioxidant-antiwear additive, and high base magnesium sulfonate anti-rust additive with a viscosity index (VI) improver for multigrade oil or without for a single grade oil. It has been found that magnesium carbonate precipitates when such formulated crankcase lubricating oils become contaminated with 1–2 weight percent water and the anti-rust addition agent is a 200–300 base number magnesium salt of alkyl-substituted benzenesulfonic acid. The oil insoluble magnesium carbonate particles precipitated have crystals of 20–60 micron size which plugs oil filters having elements of a porosity of 10–15 microns and prevents oil circulation to engine parts that need lubrication. Such oil filter plugging can cause rapid and excessive wear of engine parts and even failure of the engine because of lack of adequate lubrication.

A surprisingly successful solution to said problem of oil filter plugging by magnesium carbonate particles has been found. This solution involves providing some anti-rust function by use of a small amount of polyether addition agent, increasing amount of zinc dialkyldithiophosphate addition agent and decreased amount of higher based magnesium salt of alkyl-substituted benzenesulfonic acid.

The high based magnesium salt of alkyl-substituted benzenesulfonic acid, also known as overbased magnesium sulfonates, are obtained by combining nuclear alkyl-substituted benzenesulfonic acid and an amount of magnesium hydroxide in excess of that required to neutralize the sulfonic acid and reacting them in the presence of injected carbon dioxide gas and an overbasing aid such as an alcohol. The amount of excess magnesium hydroxide employed and the duration of the $CO_2$ injection during reaction govern the final total base number of the overbased magnesium sulfonate. Overbased or high based number mangesium sulfonates can have a total base number of 100–400 (measured by ASTM Test 664) because of the presence of magnesium carbonate dispersed by magnesium sulfonate or physically bound thereto in a micelle structure. The use of such high based magnesium sulfonate is desirable to neutralize the acidic combustion products which blow-by the piston rings and enter the engine's crankcase.

SUMMARY OF INVENTION

Precipitation is prevented of unfilterable magnesium carbonate crystals from lubricating oil formulations contaminated with 1–2 weight percent water provided, in addition to base oil blending stocks (e.g SAE 5, SAE 10 and SAE 20 weight base oils), these are used as essential addition agents: (1) a dispersant, (2) zinc dialkyl dithiophosphate antioxidant-antiwear, (3) magnesium salt of nuclear alkyl-substituted benzenesulfonic acid having a total base number above 300 and (4) a polyether anti-rust addition agent.

The dispersant addition agent can be any commonly used ashless-type for example the amide and/or imide reaction products of an amine and an alkenyl-substituted succinic acid or anhydride, wherein the alkenyl-substituent has 50 or more carbon atoms such as disclosed in U.S. Pat. No. 3,219,666 or the high molecular weight Mannich Reaction product disclosed in U.S. Pat. No. 3,368,972 from amine, aldehyde and high molecular weight nuclear alkyl-substituted hydroxyaromatic compound (e.g., alkylphenol) whose alkyl-substituent has a molecular weight in the range of 600–3000. Such dispersant is present in the lubricating oil formulation in amounts in the range of 0.5 to 5 weight percent.

The zinc dialkyl dithiophosphate antioxidant-antiwear addition agent are well known addition agents and have alkyl radicals with 3—10 carbon atoms in primary or secondary configuration as derived from $C_3$–$C_{10}$ primary or secondary alcohols. Such zinc salts are used in amounts to provide 0.5 to 2.0 weight percent thereof in lubricant oil formulations.

The high based magnesium sulfonates having total base number (measured by ASTM Test 664) above 300, suitably in the range of 350 to 450, are the overbased magnesium derivatives of petroleum sulfonic acids (e.g., mahogany acids) of 350–750 molecular weight; alkylsulfonic acids of 300–2500 molecular weight; nuclear alkyl-substituted benzenesulfonic acids such as paraffin wax substituted benzenesulfonic acids and nuclear polypropyl or polybutyl-substituted benzenesulfonic acids whose polypropyl or polybutyl-substituents have molecular weight in the range of 250–1500. Such high based magnesium sulfonates are available as solutes in light mineral oil (e.g. SAE 5W to SAE 10 weight oils) in concentrations of 30–50 weight percent and are used in amounts to provide 0.2 to 2.0 weight percent of the high based magnesium sulfonate in lubricant oil formulations.

The polyether antirust addition agent can be an alkylphenoxypolyethoxy ethanol for example, condensation product of an ethylene oxide with an alkylphenol. The alkyl-substituent of the alkylphenol should be an alkyl-hydrocarbon radical having more than six, suitably eight to fifty, carbon atoms. As an ethylene oxide reactant ethylene oxide and propylene oxide are suitable to provide the polyethoxide groups and the terminal ethanol group. The number of ethoxy group in the polyether can be in the range of 3 to 12 as in alkylphenoxy triethoxy, tetraethoxy, pentaethoxy, hexaethoxy, heptaethoxy, nonaethoxy, decaethoxy and dodecaethoxy ethanol. Such alkylphenoxy polyethoxy ethanols are well known and are commercially available. The alkylphenoxy polyethoxy ethanol of choice is isooctylphenoxy tetraethoxy ethanol and it is used to provide 0.05 to 0.5 weight percent thereof in lubricant oil formulations.

For multigrade oil formulations there is used known viscosity index (VI) improver such as the high molecular weight liquid viscous polyisobutylenes or the polyacrylates. The amount of VI improver used depends upon the viscosity grade spread desired and the lubricant base stock or blend thereof used. Those skilled in the art of formulating such multigrade oil formulations are well aware of the amounts of VI improver to be used with the various base stock oils and the mixtures thereof to obtain finished multigrade lubricating oils, for example 5W–20, 10W–20, 10–30, 10W–30, 10W–40 and the like multigrade oils.

When the oil filter plugging problem with crystals of magnesium carbonate is encountered as a result of 1–2 weight percent water contamination of finished lubricating oils having 100–300 total base magnesium sulfonates, zinc dialkyl dithiophosphate addition agents in addition to the dispersant addition agents, this problem can be overcome by substituting about one half as much higher base magnesium sulfonate having a total base number above 300, suitably 350–450 total base number for the magnesium sulfonate of 100–300 total base number, increasing the zinc dialkyl dithiophosphate addition agent usage by 40–60 percent (e.g. from 0.5 to 0.8 weight percent) and also using the above $C_6$–$C_{50}$ alkylphenyl tri- to dodeca-ethoxy ethanol in the 0.05 to 0.5 weight percent which makes up the anti-rust function decrease effected by change from high base magnesium sulfonate to higher base magnesium sulfonate. For example, when 0.5 weight percent of 400 total base number magnesium sulfonate is used to replace 1.0 magnesium sulfonate of 300 total base number, the polyether addition agent used furnishes the difference in antirust function decrease caused by such change from 300 to 400 total base magnesium sulfonate. For the use of 400 total base magnesium sulfonate in amount of one-half of 300 total base number magnesium sulfonate, the use of 0.1 weight percent alkylphenoxy tetraethoxyethanol will make up said difference in antirust function.

Such water contamination of finished formulated lubricating oil can unavoidably occur during its storage before packaging for distribution and ultimate use. Formulated lubricating oil generally is prepared in large volumes but not on a continuous hour-by-hour basis so that a large volume of finished oil is prepared and then sent to a large storage tank for later packaging. Such storage tanks upon periodic filling and emptying draw in volumes of moist air. The moisture condenses and contaminates the next fill of finished lubricating oil formulation by being well dispersed therein. The adverse effect of such 1–2 weight percent water contamination leading ultimately to magnesium carbonate crystal precipitation of the formulated lubricating oil when put in use as engine crankcase lubricant can be avoided by replacing the lower (100–300) total base number magnesium sulfonate with about one-half as much higher (350–450) total base number magnesium sulfonate, increasing the zinc dithiophosphate concentration by 40–60% and using an amount of $C_6$ to $C_{60}$ alkylphenoxy tri- to dodeca-ethoxyethanol to make up the decrease in antirust function attendant use of less higher base magnesium sulfonate.

No invention is claimed for the use of any one addition agent but rather invention is predicated upon the use of the combination of the addition agents for the purpose of preventing manganese carbonate crystal precipitation in the presence of 1–2 weight percent water.

The following illustrate one formulation (Formulation A) with which magnesium carbonate crystal precipitation was a problem and one formulation (Formulation B) which did not have said problem, hence a formulation according to the present invention. In the formulations the percent ingredient shown is weight percent based on the formulation weight and "TBN" is used to indicate total base number of the magnesium sulfonate.

Lubricant Oil Compositions

| Ingredient | Formulation A | Formulation B |
|---|---|---|
| Base Oil | 88.74% | 90.14% |
| VI Improver | 7.8% | 6.3% |
| Dispersant | 2.0% | 2.0% |
| Zinc Dialkyldithio-phosphate | 0.66% | 0.96% |
| Magnesium Sulfonate | 0.8% 300 TBN | 0.4% 400 TBN |
| Isooctylphenoxy Tetra-ethoxy ethanol | 0 | 0.1 |

To Formulations A and B there was added with vigorous mixing 1.0 and 2.0 weight percent water at ambient temperature. The mixtures were stored at 70°F. Each day thereafter the oil-water mixtures are each pumped through an oil filter having filter elements of 10–15 micron porosity. After 10 days at 70°F. the mixtures of water and Formulation A caused plugging of the oil filter element. But the mixtures of water and Formulation B did not cause plugging of the oil filter element after 22 days of storage at 70°F. The deposits on plugged filter elements were examined. The deposits were found to be crystals of about 20–60 micron length and analysis established said crystals as magnesium carbonate.

What is claimed is:

1. A lubricant oil composition which prevents precipitation of magnesium carbonate from lubricant oil formulations contaminated with at least 1 to 2 weight percent water, which composition comprises (A) the essential addition agents (1) from 0.5 to 5 weight percent ashless-type dispersant, (2) from 0.07 to 3.2 weight percent zinc dialkyldithiophosphate, wherein the alkyl groups contain three to 10 carbon atoms, (3) from 0.75 to 7.5 weight percent of high base magnesium sulfonate of total base number above 300, and (4) 0.05 to 0.5 weight percent of an alkylphenoxy polyethoxy ethanol wherein said alkyl group has 6–50 carbon atoms and the polyethoxy group has 3–12 ethoxy groups; and (B) lubricant base oil in an amount with said additions to make 100 weight percent of the lubricant oil composition.

2. The composition of claim 1 wherein the alkylphenoxy polyethoxy ethanol is an octylphenoxy polyethoxy ethanol.

3. The composition of claim 1 wherein the alkylphenoxy polyethoxy ethanol is isooctylphenoxy tetraethoxy ethanol.

4. The composition of claim 3 wherein the magnesium sulfonate has a total base number of 400.

5. The composition of claim 1 wherein there is present on a weight basis 2.0 percent ashless-type dispersant, 0.96 percent zinc dialkyldithiophosphate, 0.4 percent 400 total base number magnesium sulfonate and 0.1 percent isooctylphenoxy tetraethoxy ethanol.

* * * * *